United States Patent [19]

Heep et al.

[11] Patent Number: 4,952,100
[45] Date of Patent: Aug. 28, 1990

[54] PIPE SWITCH FOR PLANTS FOR PNEUMATICALLY CONVEYING BULK MATERIAL

[75] Inventors: Dieter Heep, Bergatreute; Paul Vogel, Weingarten; Joachim Stengel, Ravensburg, all of Fed. Rep. of Germany

[73] Assignee: Waeschle Maschinenfabrik GmbH, Ravensburg, Fed. Rep. of Germany

[21] Appl. No.: 352,981

[22] Filed: May 17, 1989

[30] Foreign Application Priority Data

May 20, 1988 [DE] Fed. Rep. of Germany ....... 3817349

[51] Int. Cl.$^5$ ............................................. B65G 53/56
[52] U.S. Cl. .................................. 406/182; 137/874; 137/876
[58] Field of Search ............................ 406/182, 1, 191; 137/876, 874

[56] References Cited

U.S. PATENT DOCUMENTS

| 406,447 | 7/1889 | Kennedy, Jr. | 406/182 |
|---|---|---|---|
| 1,951,434 | 3/1934 | Needham | 406/182 X |
| 2,690,931 | 10/1954 | Baresch | 406/182 |
| 4,063,572 | 12/1977 | Anderegg et al. | 406/182 X |
| 4,264,244 | 4/1981 | Steele | 406/182 |

FOREIGN PATENT DOCUMENTS

| 1155057 | 9/1963 | Fed. Rep. of Germany | 406/182 |
|---|---|---|---|
| 27714 | 10/1967 | Fed. Rep. of Germany | 406/182 |
| 2051177 | 4/1972 | Fed. Rep. of Germany | 406/182 |
| 2947953 | 7/1981 | Fed. Rep. of Germany | 406/191 |
| 1413742 | 11/1964 | France | 406/182 |

Primary Examiner—Joseph F. Peters, Jr.
Assistant Examiner—James M. Kannofsky
Attorney, Agent, or Firm—Henry M. Feiereisen

[57] ABSTRACT

A pipe switch for plants for pneumatically conveying of bulk material includes a housing with three ports and having a rotatable cock for selectively connecting one port with the second or third port. The cock is provided with two pipe sections which define two flow paths and are connected at their ends via suitable ring segments. One of the ring segments is of sufficient dimension to sealingly bar the one port which is not in communication with the first port when the cock is in the respective end position. A journal connects the pipe sections at a central location thereof and is rotatably supported in side cover plates of the housing for allowing a rotation of the cock between the two end positions.

11 Claims, 3 Drawing Sheets

PIPE SWITCH FOR PLANTS FOR PNEUMATICALLY CONVEYING BULK MATERIAL

BACKGROUND OF THE INVENTION

The present invention refers to a pipe switch or multiport valve for pneumatically conveyed bulk material, and in particular to a pipe switch including a housing provided with a first port, a second part extending in axial direction of the first port and a third port having an axis extending at an angle of less than 90° relative to the axis of the second port, and with the housing accommodating a cock for selectively connecting the first port with the second port and the third port in dependence on the position thereof and being rotatably supported in side cover plates of the housing via a shaft which extends perpendicularly to the plane containing the axis of the ports.

A pipe switch of this type is known and is actuatable manually, electromotively or electropneumatically for selectively feeding bulk material between a feeding area and a first and second receiving area or for selectively feeding bulk material from a first or second feeding area to a common receiving area. Basically, such a pipe switch can be pressure-operated or suction-operated. The housing and the cock are cast parts usually made of aluminum or chrome nickel steel. The inner wall of the housing is provided with grooves surrounding the entrance area of the respective ports and accommodating seals which ensure a sealing of the interior of the housing against a prevailing overpressure or underpressure during operation and cooperate with a respective circumferential area of the cock for sealingly closing the port which is not in use. From time to time, it is necessary to dismantle such pipe switches for cleaning purposes or inspection and maintenance. In view of frequently exposed assembly locations, a dismantling of the cast cock has proven to be difficult and dangerous because of its large weight when pipe switches of great nominal width are concerned.

A further drawback of a pipe switch of this type resides in the fact that the cock should be made of hardenable special cast when utilizing the pipe switch for highly abrasive bulk material e.g. granulates of plastic material with glass fiber filling. The use of such special cast is not only expensive but considerably restricts the material selection. For such cases, it was therefore proposed to use a pipe switch of a next higher nominal width with e.g. a cock of cast aluminum and including flow channels which accommodate bushings of correspondingly wear-resistant special alloys. Since the respectively used materials for the bushings and the cock can normally not be welded together, the bushings are mounted or attached by screwing or gluing. This, however, is rather cumbersome and still results in loose bushings or in insufficient sealing and, moreover, considerably increases the weight of the pipe switch.

SUMMARY OF THE INVENTION

It is thus an object of the present invention to provide an improved pipe switch or multiport valve obviating the afore stated drawbacks.

This object and others which will become apparent hereinafter are attained in accordance with the present invention by providing a cock which includes a first pipe section for defining a first flow path between the first port and the second port and a second pipe section for defining a second flow path between the first port and the third port, with the cock being rotatably supported by a shaft and with the first and second pipe sections being connected at a central area by the shaft and at their opposing ends by suitable ring segments.

By providing the pipe switch in this manner, the cock is reduced to those structural elements which are necessarily required for operation of the pipe switch i.e. the two pipe sections which are securely connected with each other and the shaft. Thus, the pipe switch according to the invention is characterized by a considerably reduced weight even at large nominal widths and in addition permits the cock to be designed as welded structure. In contrast to cast materials, weldable materials with sufficient wear resistance are known in a great number.

According to a further feature of the present invention, the ring segments for connecting the ends of the pipe sections extend coaxially to the inner wall surface of the housing, with one ring segment extending in the area of the second and third ports having a circumferential area which is sufficiently dimensioned for sealingly barring the second port when the first port is connected to the third port and for sealingly barring the third port when the first port is connected to the second port.

In order to provide a dimensional stability between the pipe sections, the shaft extends between the first and second pipe sections at a central area thereof and is provided with opposing arc shaped recesses in correspondence to the contour of the outer surface of the pipe sections.

According to yet another feature of the present invention, the dimensional stability of the cock may be further enhanced by providing a web between each pipe section and the ring segment extending in the area of the adjoining second and third ports.

Preferably, instead of acting upon the shaft, the rotational drive of the cock is operatively connected eccentrically to the cock via a rod which engages one of the webs. By eccentrically connecting the rod to the cock, the free and thus available space within the housing is suitable utilized. Such a construction allows the drive to be easily disengaged so that a possible disassembly of the cock is facilitated or even rendered redundant because the cock can be adjusted manually to such angular positions in which for example the seals inserted in the inner wall of the housing are completely accessible for exchange thereof.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 2:
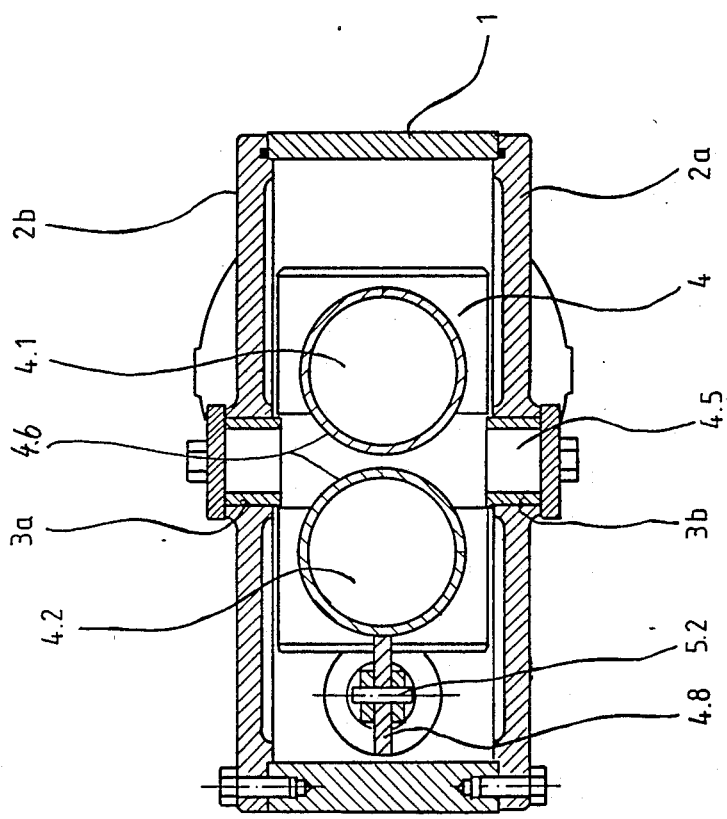
FIG. 2 is a cross-sectional view of the pipe switch taken along the line II—II in FIG. 1.

In the drawing, there is shown one embodiment of a pipe switch or multiport valve in accordance with the present invention. The pipe switch includes a cylindrical housing 1 of Y-shape which defines three circumferential ports 1a, 1b, 1c. The first port 1a and the second port 1b extend along a common center axis which is offset to the geometric center of the housing 1. Accommodated within the interior of the housing 1 is a cock generally designated by reference numeral 4 and including a shaft 4.5 with its journals being rotatably supported in bearing bushings 3a, 3b provided in opposing side cover plates 2a, 2b which laterally close the housing 1 as shown in FIG. 2.

Figure 1:
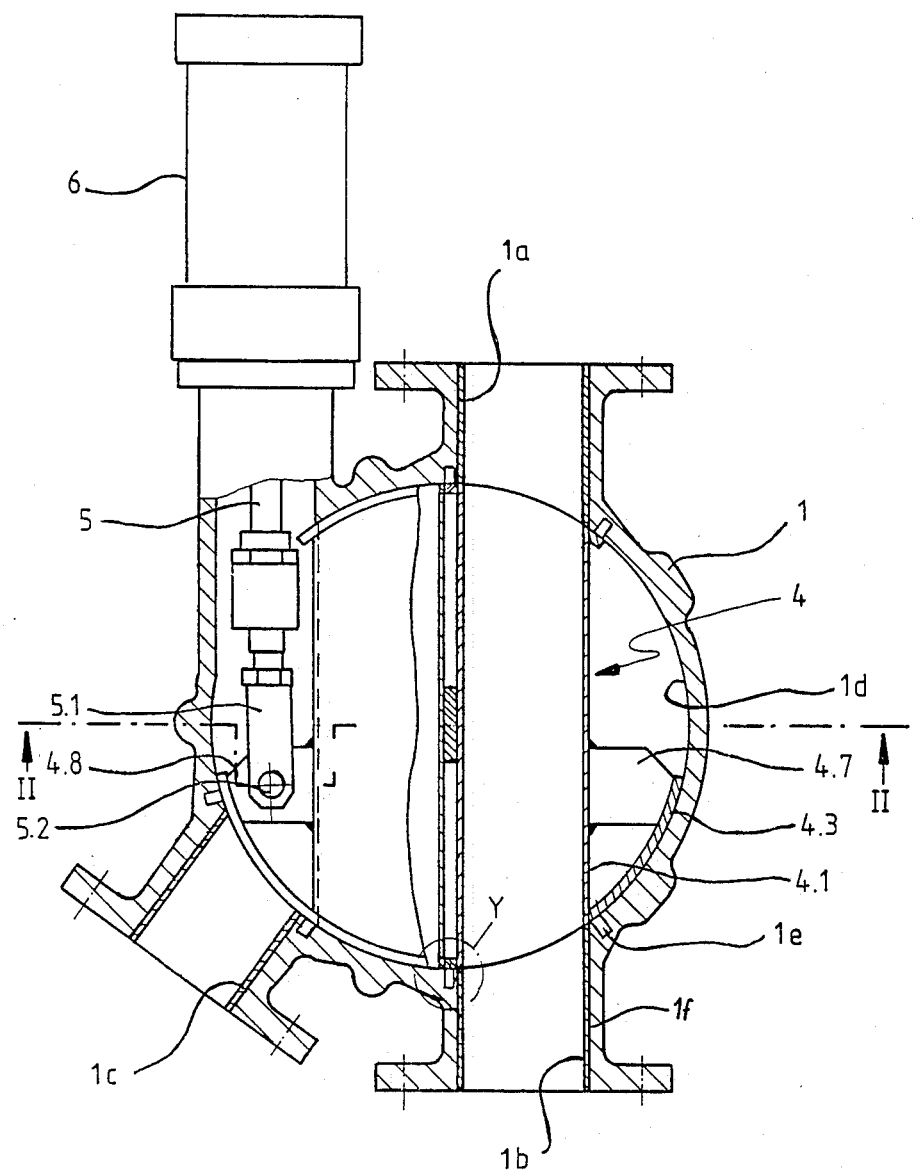
FIG. 1 is a partial longitudinal section of one embodiment of a pipe switch in accordance with the present invention.
Figure 3:
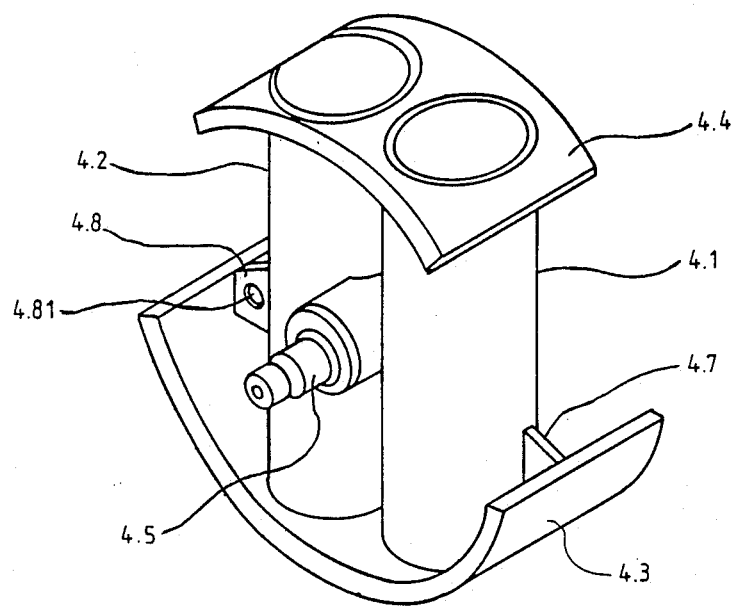
FIG. 3 is a perspective illustration of the cock of the pipe switch.

The cock 4 is provided with two parallel pipe sections 4.1, 4.2 which as shown in particular in FIG. 3 are connected to each other at their opposing ends via respective ring segments 4.3, 4.4. Suitably, the ring segment 4.3 is dimensioned such that it extends over a larger arc than the ring segment 4.4 in order to ensure a sealing and barring of the ports 1b or 1c in the respective positions of the cock 4. Thus, when the cock 4 occupies the end position as shown in FIG. 1, the pipe section 4.1 connects the first port 1a with the second port 1b while the ring segment 4.3 bars the third port 1c from any connection. When rotating the cock 4 into the other end position, the pipe section 4.2 connects the first port 1a with the third port 1c, with ring segment 4.3 barring second port 1b from any connection.

The ring segments 4.3, 4.4 extend coaxial to the inner wall surface 1d of the housing 1 and are spaced therefrom to define a small gap. In the area of each port 1a, 1b, 1c, the inner wall surface 1d of the housing 1 is provided with a groove 1e which accommodates an elastomer seal 7 projecting into the gap between the ring segments 4.3, 4.4 and the surrounding inner wall surface 1d. Thus, the ring segments 4.3, 4.4 ensure not only a precise positioning of the ends of the pipe sections 4.1, 4.2 but also act as sealing surfaces in cooperation with the elastomer seals 7.

In order to improve the dimensional stability of the cock 4, webs or bridges 4.7, 4.8 are arranged between the pipe sections 4.1, 4.2 and the ring segment 4.3. The web 4.8 includes an opening 4.81 (FIG. 3) which is engaged by the bifurcated end 5.1 of a tie rod 5 via a bolt 5.2. The tie rod 5 projects beyond the housing 1 and is operatively connected to a working cylinder 6 which is shown only schematically and serves as drive for adjusting the cock 4 between both its end positions, with the rotational angle between these end positions being about 35°.

The cock 4 is a welded structure so that the most suitable, weldable material, especially highly wear-resistant material can be selected for making the individual elements of the cock 4. The ring segments 4.3, 4.4 are made in such a manner that the openings for receiving the pipe sections 4.1, 4.2 are provided in a flat state of the ring segments 4.3, 4.4 which are subsequently rolled to receive their bent shape. The pipe sections 4.1, 4.2 are each provided with openings in correspondence with the contour of the inner wall surface 1d of the housing 1 on a turning machine for example through cutting by means of a high power laser. The shaft 4.5 is provided at a central location thereof with two opposing arc shaped recesses 4.6 in correspondence to the outside surface of the pipe sections 4.1, 4.2. These individual elements of the cock 4 are then welded in an auxiliary machine with each other and with the suitably made webs 4.7, 4.8. Subsequently, the pipe sections may be tempered. Precise fitting of the elements is obtained in a turning lathe.

Figure 4:
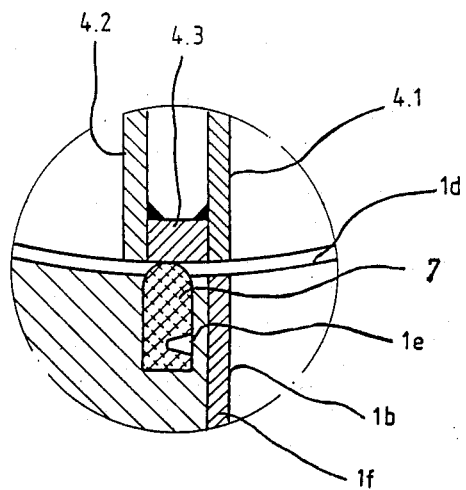
FIG. 4 is a cross-sectional view on an enlarged scale of the detail Y in FIG. 1.

In case, it is desired to make the cock 4 of highly wear-resistant material, the housing 1 of the pipe switch can still be made for example of cast aluminum if the ports 1a, 1b, 1c are lined with respective wear-resistant bushings 1f as shown in FIGS. 1 and 4.

While the invention has been illustrated and described as embodied in the pipe switch, it is not intended to be limited to the details shown since various modifications and structural changes may be made without departing in any way from spirit of the present invention.

What is claimed as new and desired to protected by Letters Patent is set forth in the appended claims:

We claim:

1. A pipe switch for a plant for pneumatically conveying a material such as bulk material, comprising:
    a housing defining an inner wall surface and having a first port, a second port and a third port;
    regulating means accommodated in said housing and movable between two positions for selectively controlling the flow of material from said first port to said second port via a first flow path and from said first port to said third port via a second flow path, said regulating means including a first pipe section for defining said first flow path, and a second pipe section for defining said second flow path;
    support means for rotatably supporting said regulating means in said housing, said support means including a shaft extending perpendicular at a central area between said first and second pipe sections for connecting said first and second pipe sections with each other at the central area thereof; and
    linking means for connecting said first and second pipe sections in the area of their respective ends, said linking means including a first ring segment for connecting said first and second pipe sections at one end thereof, and a second ring segment for connecting said first and second pipe sections at the other end thereof, one of said ring segments having a circumferential area sufficiently dimensioned for sealingly barring said second port when said first port is connected to said third port and for sealingly barring said third port when said first port is connected to said second port.

2. A pipe switch as defined in claim 1 wherein each of said first and second ring segments extends coaxial to said inner wall surface at a distance thereto to define a gap therebetween.

3. A pipe switch as defined in claim 2, and further comprising sealing means projecting into said gap for providing a sealing between said first and second pipe sections and said inner wall surface of said housing.

4. A pipe switch as defined in claim 1 wherein said second port defines an axis which extends coaxial with said first port, said third port defining an axis extending at an angle of less than 90° relative to said axis of said second port, with said first ring segment facing the area of said second and third ports and representing said one ring segment.

5. A pipe switch as defined in claim 1 wherein said shaft is provided with opposing arc-shaped recesses in correspondence to the contour of the outer surface of said first and second pipe sections.

6. A pipe switch as defined in claim 1, and further comprising stabilizing means for enhancing dimensional stability of said regulating means, said stabilizing means including a web extending between one of said pipe sections and said one ring segment.

7. A pipe switch as defined in claim 6, wherein said stabilizing means includes a further web extending between the other one of said pipe sections and said one ring segment.

8. A pipe switch as defined in claim 6, and further comprising rotating means eccentrically connected to said regulating means for turning said regulating means between said positions.

9. A pipe switch as defined in claim 8, wherein said web includes an opening, said rotating means having a tie rod engaging said opening of said web and extending outwardly to an actuating device for allowing actuation of said tie rod so as to rotate said regulating means.

10. A pipe switch as defined in claim 1 wherein said housing defines a central axis, said second port defining an axis extending coaxial with said first port to define a common axis and said third port defining an axis extending at an angle of less than 90° relative to said axis of said second port, said common axis extending offset to said central axis of said housing.

11. A pipe switch for a plant for pneumatically conveying bulk material, comprising:

a housing having a first port, a second port having an axis extending coaxial with said first port, and a third port defining an axis extending at an angle of less than 90° relative to said axis of said second port;

a cock accommodated in said housing and movable between two positions for selectively controlling the flow of material from said first port to said second port via a first flow path and from said first port to said third port via a second flow path, said cock including a first pipe section for defining said first flow path, and a second pipe section for defining said second flow path;

a shaft extending perpendicular at a central area between said first and second pipe sections for connecting said first and second pipe sections with each other at the central area thereof and for rotatably supporting said cock in said housing; and a first ring segment for connecting said first and second pipe sections at one end thereof, and a second ring segment for connecting said first and second pipe sections at the other end thereof, one of said ring segments having a circumferential area sufficiently dimensioned for sealingly barring said second port when said first port is connected to said third port and for sealingly barring said third port when said first port is connected to said second port.

* * * * *